United States Patent [19]

Bertolette et al.

[11] Patent Number: 4,910,991
[45] Date of Patent: Mar. 27, 1990

[54] TUBE END DOUBLE END FORMING METHOD AND APPARATUS

[75] Inventors: Reed Bertolette, Woodbury; Nicholas J. Marracino, Torrington, both of Conn.

[73] Assignee: T-Drill * BMI, Inc., Torrington, Conn.

[21] Appl. No.: 221,377

[22] Filed: Jul. 19, 1988

[51] Int. Cl.⁴ .................... B21D 19/00; B21D 21/00
[52] U.S. Cl. ........................ 72/370; 72/317;
  72/318; 72/372; 225/2; 225/96.5
[58] Field of Search ............... 72/317, 318, 294, 370,
  72/372, 316, 356; 225/2, 96.5, 105

[56] References Cited

U.S. PATENT DOCUMENTS

3,779,446 12/1973 Lemelson ...................... 72/317 X
4,111,346 9/1978 Bertolette .................... 225/96.5
4,281,530 8/1981 McElhaney ........................ 72/294
4,761,982 8/1988 Snyder ........................ 72/370 X Primary Examiner—Hien H. Phan
Attorney, Agent, or Firm—McCormick, Paulding & Huber

[57] ABSTRACT

A continuous supply of tubing is fed intermittently into a work station. Partial cuts are made at periodic intervals by a cutoff head that operates in timed relation with tube clamping device. Tube gripping device then pulls on the end portion or segment to position it precisely downstream of and in alignment with the freshly cut tubing end. A double tube end forming device moves in between the downstream end of the tubing and the upstream end of the tube segment. This device has tube end forming heads that include tooling for suitably shaping both these ends simultaneously.

7 Claims, 7 Drawing Sheets

TUBE END DOUBLE END FORMING METHOD AND APPARATUS

BACKGROUND OF THE INVENTION

Tube forming machines generally require that segments of the tube be cutoff in a tube cutting machine, such as that described in my prior U. S. Pat. No. 4,111,346, after which the tube ends are suitably formed to provide a number of desired tube end configurations in further steps in the overall process of fabricating tube segments generally. Tube double end forming now requires that these severed segments be conveyed to a station where both ends are formed by independently operable forming devices.

The system to be described avoids the necessity for precisely positioning each tube segment at such a station in a two station process that involves a lack of control over the tube segment due to the requirement for conveying the tube segment from the cut off station to the tube end forming station.

SUMMARY OF THE INVENTION

The general object of the present invention is to provide a method and apparatus for simultaneous forming the end of a severed tube segment and the adjacent end of the tubing from which it has been severed in a single step process. A double tube end forming means is provided on a cross slide and cooperates with means for moving the severed tube segment away from the tubing end so that the double tube end forming means can be so operated. In accordance with the method of the present invention the tubing is moved intermittently through a cutoff machine of the above mentioned type by means of a feed clamp assembly operable in timed relationship therewith. The tubing is successively gripped and released and advanced in the downstream or axial direction into a work station. The cutoff head provides partial cuts at predetermined points along the tubing, and this is done in cooperation with a clamping assembly to provide partial cuts that re spaced a predetermined distance apart along the tubing. Each tube segment is gripped and pulled away so as to separate each segment in turn at the partial cut points. This is accomplished by moving the tube gripping device to a position precisely spaced downstream of its initial position and in precise alignment with the tube end that it was separated from. The tube ends are then formed by a tube end forming device that moves in between the tube ends that have just been severed. Both tube ends are formed simultaneously into any desired configuration depending upon the particular requirements of the job.

The apparatus for carrying out the above described method includes means for intermittently moving a supply of tubing in a downstream direction so that a portion projects into the work station with means being provided for partially cutting the tubing at predetermined points between the successive tubing movement. Conventional clamping means is provided in association with the cutting means for this purpose. The means for gripping the tube segment downstream of one such partial cutting point is used to move the tube segment away from the clamping means to separate the tube segment at the predetermined point and to provide the requisite spacing and alignment between the downstream end of the tubing and the upstream end of the separated tube segment for receiving a double end tube forming device that moves into the work station on a cross slide. This device simultaneously forms the adjacent ends of the tubing and tube segment and the process can be repeated continuously to produce tube segments of any desired end configuration and incidentally of any desired length.

DETAILED DESCRIPTION

Figure 1:
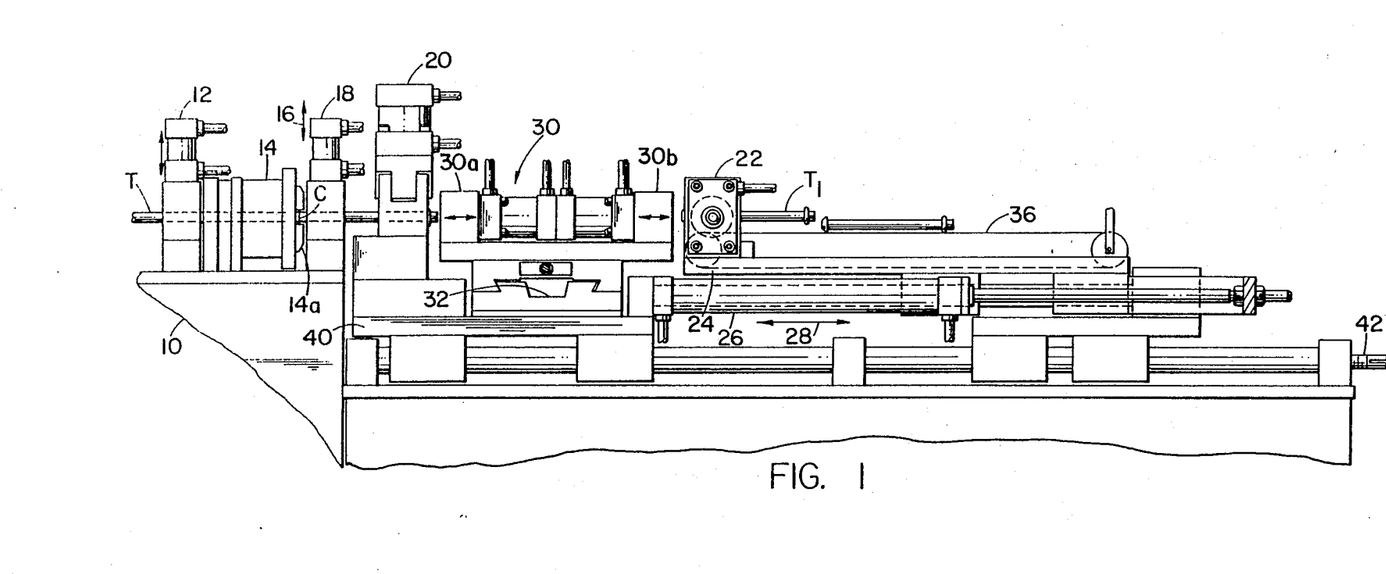
FIG. 1 is a somewhat schematic elevational view of a machine adapted to carry out the method of the present invention, movement of the various components being illustrated by double ended arrows, and portions of the machine being broken away or shown in broken lines to better illustrate the interaction of these components.

Turning now to the drawings in greater detail, FIG. 1 illustrates generally at 10 a typical tube cutting machine of the type described in detail in my prior U.S. Pat. No. 4,111,346. Such a machine includes means for accommodating a supply of tubing T in continuous form (such as a roll not shown) and for clamping the tubing at a predetermined point by fluid operated clamping assembly means 12 so as to permit operation of a tube cutting head 14 as illustrated in FIGS. 1, 2 and 3 of said prior U.S Pat. No. 4,111,346. Such a cutting head 14 comprises a rotary cutting head portion 14a through which the tubing passes, and in which head are provided rollers and cutting means to achieve at least a partial cut through the tubing at a predetermined distance from the free end of the tubing as shown.

Figure 2:
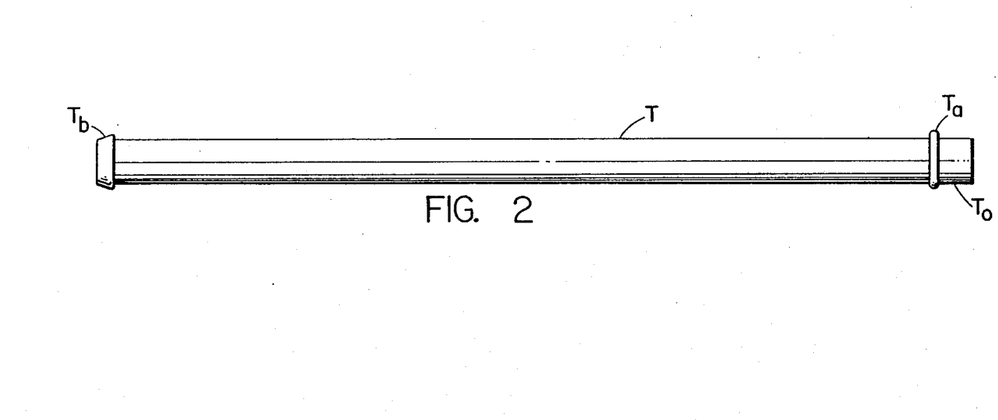
FIG. 2 is an enlarged view of one tube segment after it has been separated from the supply of the tubing and after the ends have been formed in the apparatus of FIG. 1 and in accordance with the method of the present invention.

In accordance with the present invention the tubing T is not severed at this cutting station but rather is partially cut at predetermined points along the tubing T as dictated by the length of the tube segments to be formed (see FIG. 2 for a typical tube segment and typical end formation to be provided on such a tube segment.

Clamping means is provided on the tube feeding and cutting machine portion and this clamping means comprises a conventional clamp assembly 18 movable as suggested by arrow 16 to steady the projecting end portion of the tubing while it is partially cut as described above. Clamp assembly 18 can be clamped and released in synchronism with the clamp 12 referred to previously. More particularly the tubing T is fed downstream after such a partial cut, and after these clamps 12 and 18 have been released. The tube segment $T_1$ is advanced from the position shown in FIG. 1 to the position shown in FIG. 3 by tube gripping means 22 to be described. Tube clamping means 20 is provided adjacent the upstream side of the partial cut C in the tubing T so as to steady the tubing after it has been advanced to the position shown for it in FIG. 3.

The tube gripping device or means 22 provides two functions. First to secure the upstream end portion of the tube segment defined by the partial cut C and the end of the tube segment $T_1$. Secondly, the tube gripping means 22 is provided on a horizontally translatable carriage assembly 24 that provides for movement of the gripping device 22 from a upstream or first position illustrated in FIG. 3 to a downstream position illustrated in FIGS. 4, 5 and 6. The movement of the device 22 is under the control of a fluid cylinder 26 that is adapted to move the carriage assembly 24 in the direction of the double ended arrow 28 in FIG. 1.

Figure 3:
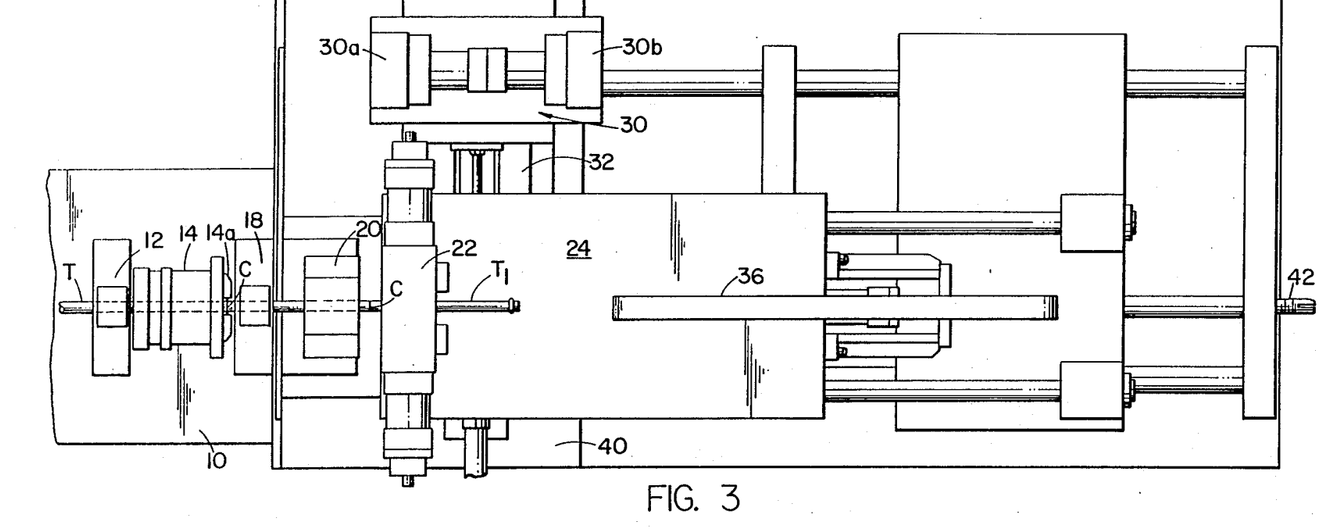
FIG. 3 is a plan view of the apparatus illustrated in FIG. 1, but with the tube gripping means provided in a different position, and with the double ended tube forming device provided in its inactive position.

Downstream motion of the tube segment gripping means 22 from the FIG. 3 position to that illustrated in the other views will sever the tube segment $T_1$ from the tubing T at the partial cut position C referred to previously and will do so under close control so that the tube segment $T_1$ remains in axial alignment with the tubing T from which it has been separated even as it is moved downstream as suggested in the drawings.

Figure 4:
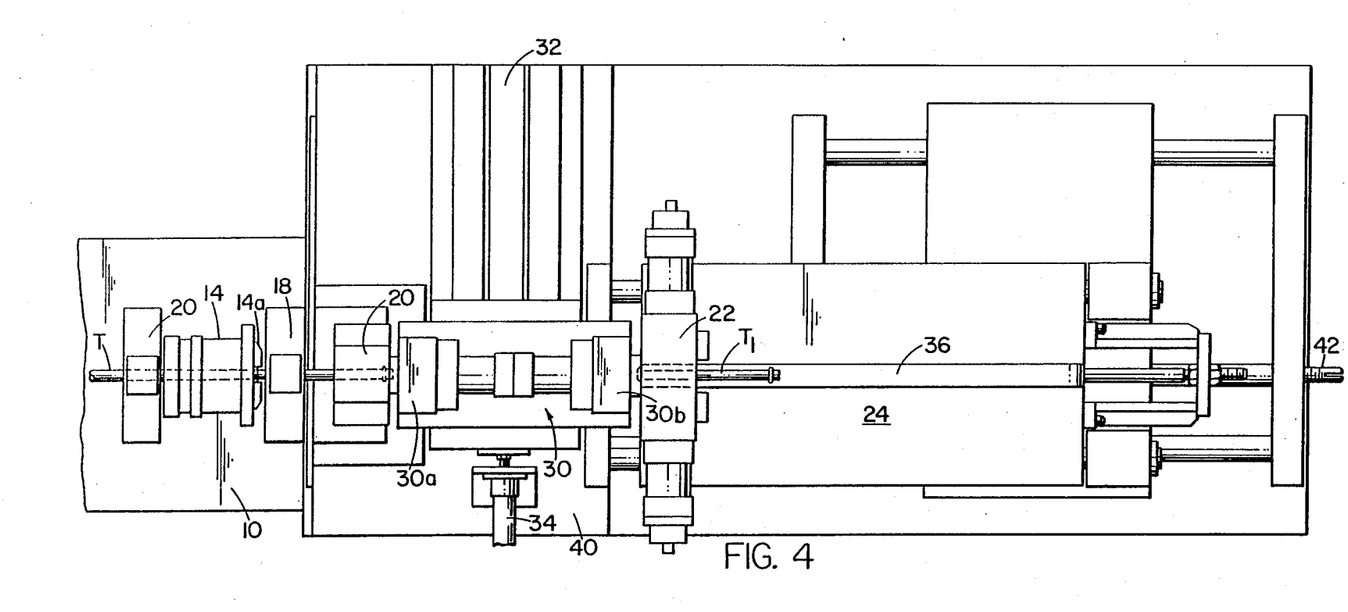
FIG. 4 is a view similar to FIG. 3 but illustrating the tube end forming means in its active position and with the tube gripping means provided in the position shown in FIG. 1.
Figure 5:
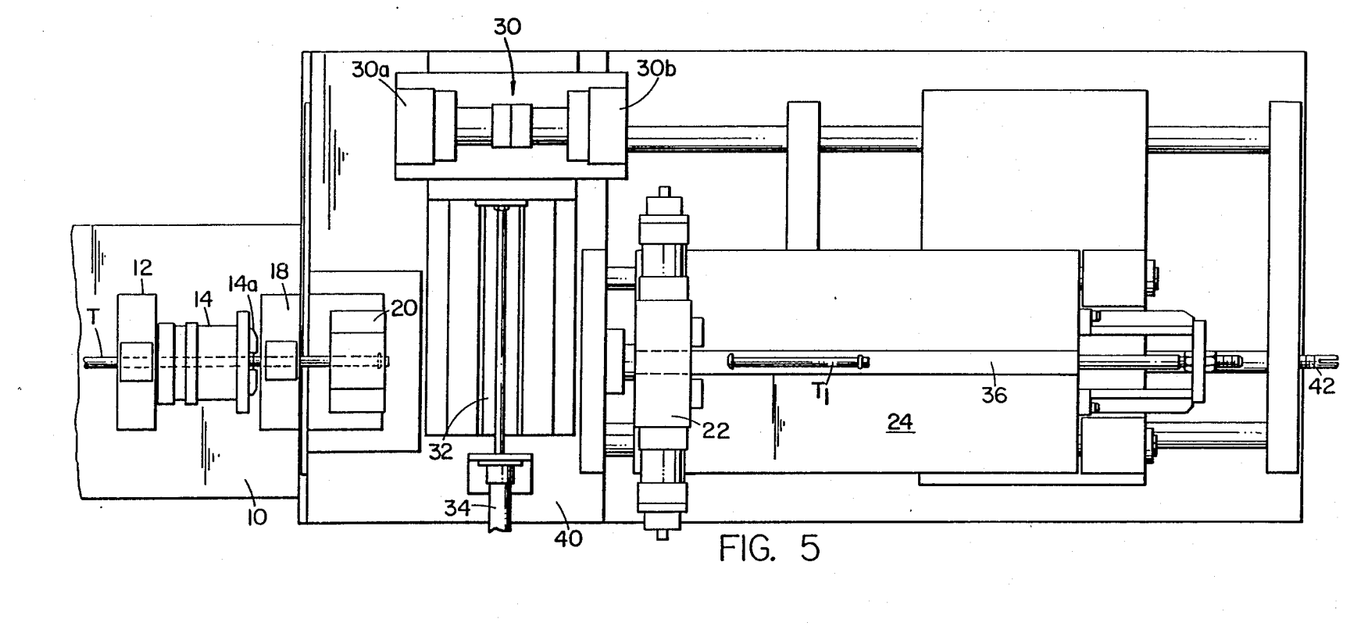
FIG. 5 is a view similar to FIGS. 2, 3 and 4 but with the double tube end forming means provided in its inactive position and with the gripping means having discharged a formed tube segment for transfer downstream on a take away conveyor provided for this purpose in the machine.
Figure 6:
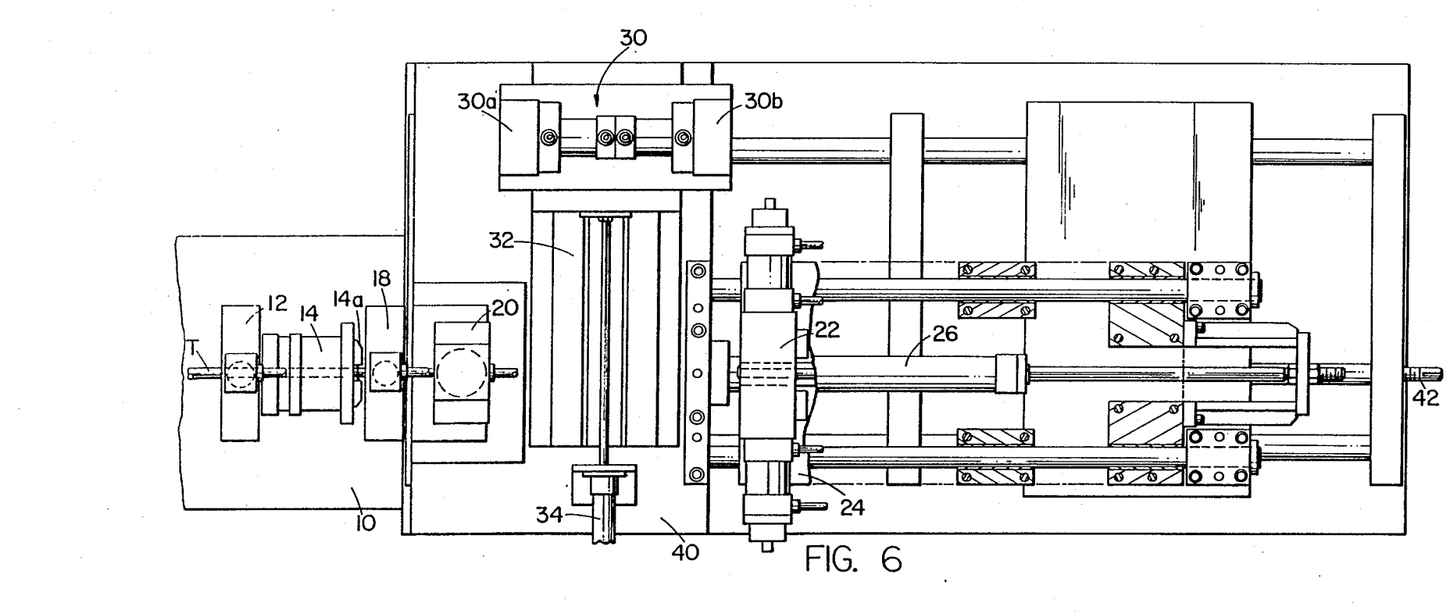
FIG. 6 is a view similar to FIG. 5 but with portions broken away to reveal the internal structure of the means for moving the tube segment gripping device and for adjusting its second position.

As suggested in FIG. 4 the space provided between the upstream end of the tube segment $T_1$ and the downstream end of the tubing T provides a predetermined space for receiving a double end tube forming device 30 that is provided on a cross slide 32 in the machine frame so as to be movable from an inactive position, best shown in FIG. 5, to an active position as suggested in FIGS. 1 and 4. As so constructed and arranged the downstream end of the tubing T and the upstream end of the tube segment $T_1$ can be simultaneously formed by the end forming tooling as desired, and as suggested generally at the right and left hand end of the tube segment of FIG. 2. Thus, the double tube end forming device 30 of the drawings actually comprises two coaxially arranged tube forming heads that may or may not be identical, but that are operable simultaneously to properly shape the left and right hand ends of each tube segment successively formed in an apparatus in accordance with the method of the present invention.

The actual configuration for these tube forming heads 30a and 30b will be dictated by the desired end configurations of the tube segment and as mentioned previously. Where the ends of the tube segment are to be identically formed the tooling or heads may be identical but such is not necessary in the present invention and differently configured tube ends can be provided simply by changing the heads 30a and 30b in the double tube end forming attachment 30. A hydraulic cylinder 34 is provided to move the double tube end forming attachment 30 between the inactive position shown for it in FIG. 5 and the active position of FIGS. 1 and 4.

Figure 7:
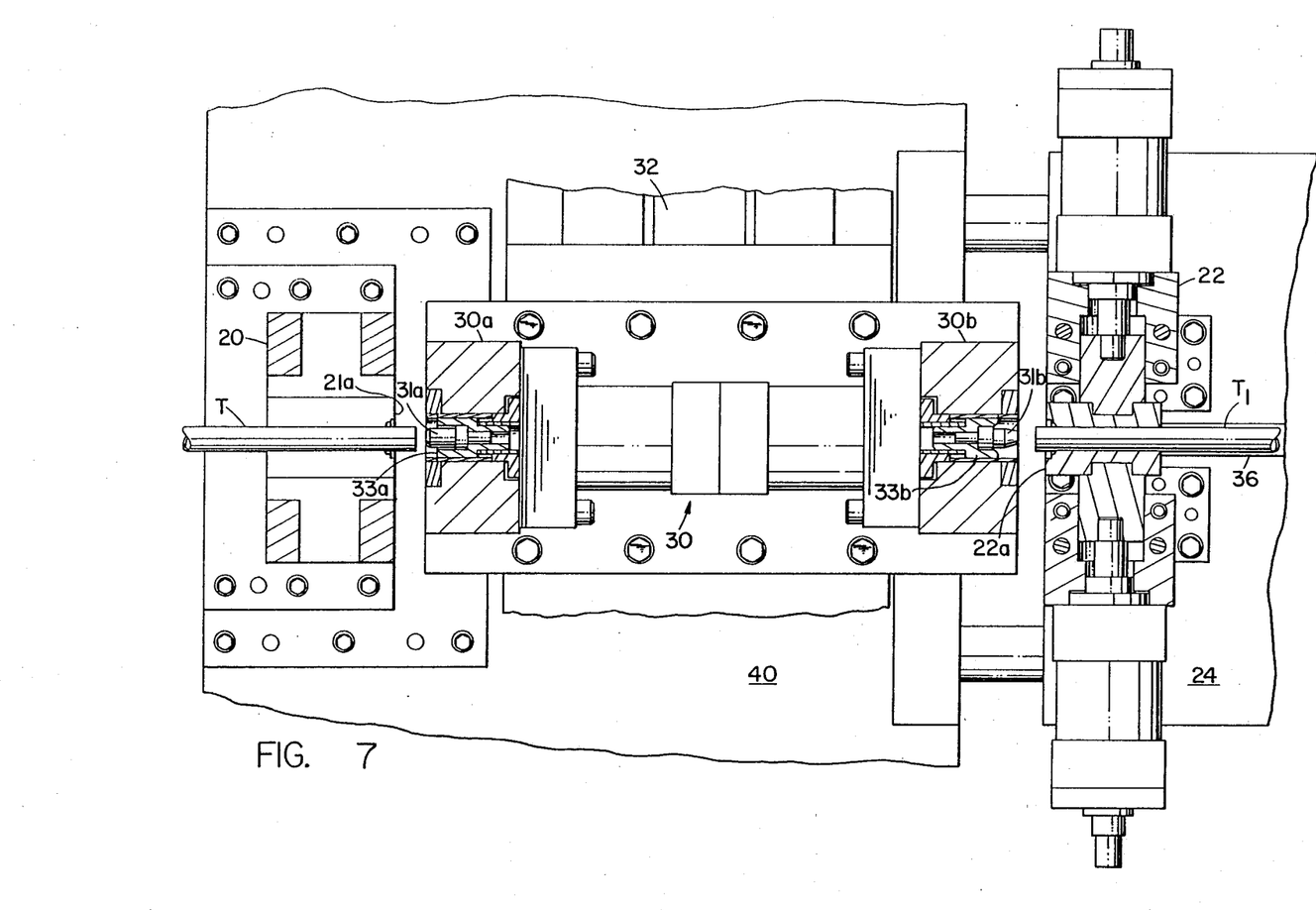
FIG. 7 is a top plan view of the double ended tube forming device and tube clamping and gripping means, in the same general positions as depicted in FIG. 4, but with portions broken away.
Figure 8:
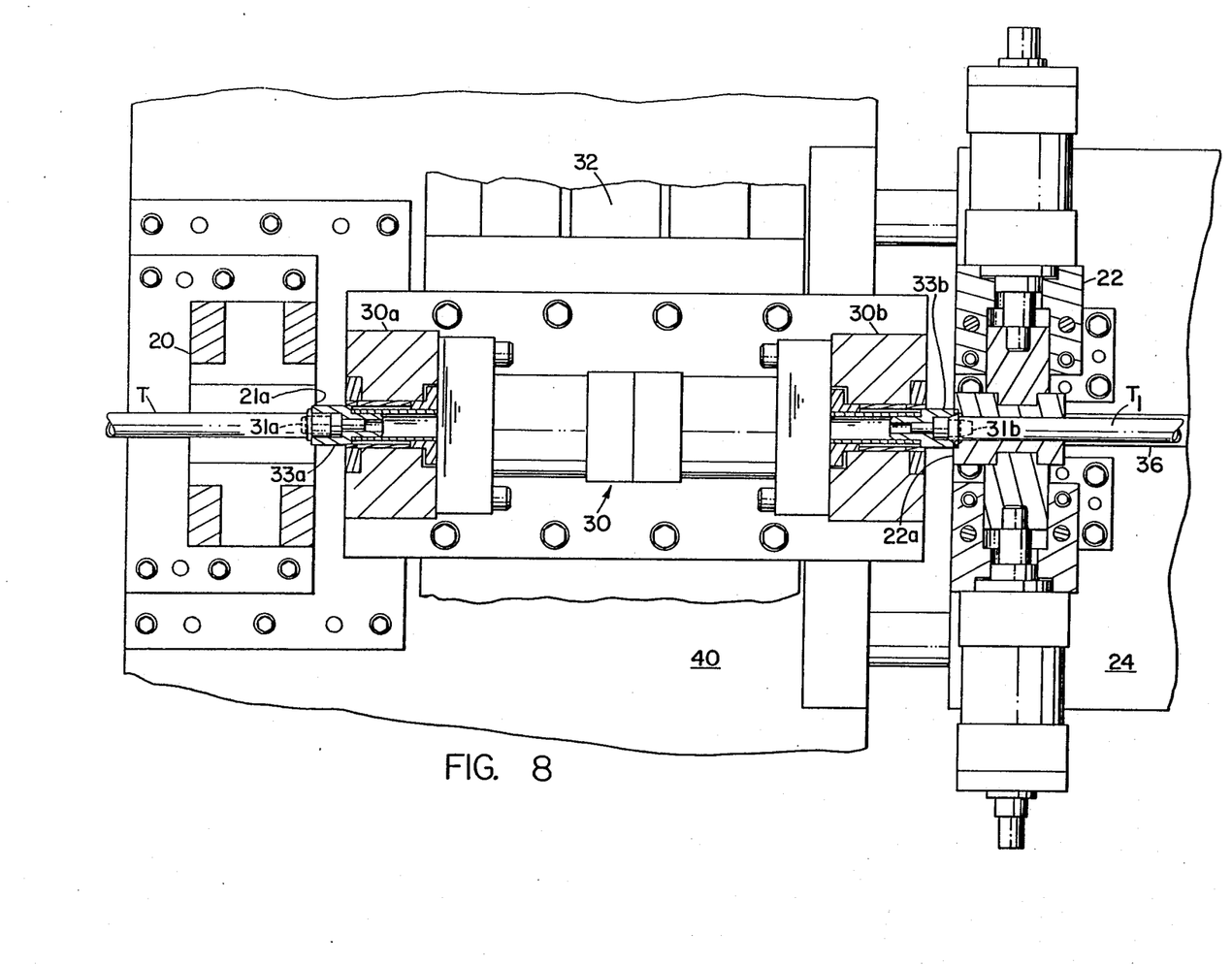
FIG 8 is a top plan view of the apparatus illustrated in FIG. 7 after the tube ends have been formed.

As shown in FIGS. 7 and 8 each head, 30a and 30b respectively, comprises an axially reciprocable ram that is movable into the adjacent end of the clamped tubing, or tube, to provide the desired tube end shapes as suggested in FIG. 2. The head 30a cooperates with the tube clamping means 20 to shape the downstream or right hand end of tube T. The head 30b cooperates with the tube gripping means 22 to shape the upstream end of the tube segment $T_1$.

More specifically, the head 30a includes a fluid actuator for moving a ram 31a from its FIG. 7 position into the end of the tube T as shown in FIG. 8. A fixed die surface is defined by the clamping means 20 as shown at 21a, and the ram 31a includes an annular tube constraining portion 33a that moves with the ram to retain the tube diameter at $T_O$ (See FIG. 2) as the flange $T_a$ is formed between die 21a and the left hand end of this annular portion 33a.

The head 30b includes a fluid actuator for moving a ram 31b from its FIG. 7 position into the end of the tube segment $T_1$ as shown in FIG. 8. A fixed die surface is defined by the tube gripping means 22 as shown at 22a. The gripping means 22 operates horizontally to clamp and release the tube segment so that the fixed die is actually made in two halfs. This is also true of the die associated with the clamping means 20, although the latter moves vertically to clamp and release the tubing T. An annular tube flaring portion 33b of the ram 31b shapes the outside of the tube end as suggested at $T_b$ in FIG. 2. As so constructed and arranged two tube ends are formed simultaneously as a result of separating each tube segment from the supply of tubing T and positioning said tube segment $T_1$ in a structure 22 that supports the tube segments $T_1$ in alignment with, and in precisely spaced relationship to the end of the supply tubing T.

Finally, once the ends of the tubing T and tube segment $T_1$ have been appropriately formed gripping means 22 releases the tube segment $T_1$ for transfer downstream for further processing on a take away conveyor 36 provided for this purpose in the horizontal transfer table or carriage assembly 24. The stroke 28 of the carriage assembly 24 can be adjusted to accommodate different lengths of the tube segments to be fabricated. A horizontally extending bed or frame 40 is provided to slidably support the clamping means 20 and carriage assembly for the gripping means 22 as well as the cross slide 32 for the double end tube forming attachment 30 referred to previously. All of the above are positioned by means of a hydraulic motor (not shown) coupled to the end of lead screw 42 so as to preposition the above described apparatus relative to the cutoff station thereby accommodating any length tube segment to be formed in accordance with the apparatus and method of the present invention.

I claim:
1. A method of forming tube segments from a supply of tubing and comprising the following steps:
   (a) intermittently moving the tubing forwardly into a cutoff head so that said tubing projects into a work station,
   (b) periodically activating the cutoff head to provide partial cuts at predetermined points along said tubing,
   (c) clamping said tubing rearwardly of one such partial cut,
   (d) gripping said tubing forwardly of said one partial cut,

(e) separating said tubing at said one partial cut by moving said tubing gripping device forwardly to an aligned position that provides a predetermined space between the forward end of the tubing and the separated tubing segment rear end, (f) providing tube end forming devices in the space between these forward and rear ends of the tubing and the tubing segment, (g) simultaneously forming said forward and rear ends of the tubing and the tubing segment.

2. The method of claim 1 wherein said step of providing said tube end forming devices between said rear and forward ends comprises moving said devices from inactive positions out of the path of movement for said gripping device to active positions wherein these end forming devices are aligned with one another and with said separated tubing ends.

3. The method of claim 2 further including the step of returning said end forming devices from said active to said inactive position thereof, and releasing said tubular segment from said gripping device.

4. The method of claim 3 further including the step of moving said gripping device forwardly to a position adjacent a succeeding partial cut and separating another tubing segment by moving it to said spaced position and providing said end forming devices between rear and forward ends thereof to form the ends of tube segments in sequence as aforesaid.

5. Apparatus for forming the ends of tube segments, said apparatus comprising:

(a) means for intermittently moving a supply of tubing in a downstream direction so that a portion projects into a work station, (b) means for partially cutting said tubing at a predetermined point to correspond to particular tube segment length, (c) means for clamping said tubing upstream of one such partial cutting point, (d) means for gripping said tubing downstream of said one partial cutting point, (e) means for moving said gripping means and tubing to separate a segment at said predetermined point on said tubing and to provide a space between the downstream end of the tubing and the upstream end of the separated tube segment, (f) means for forming the upstream end of said tube segment and the downstream end of said tubing, said means being movable from and to an active position for simultaneously so forming said ends when said tube segment has been so separated from said tubing.

6. The apparatus of claim 5 further characterized by cross slide transfer means for said means for simultaneously forming said tube segment and tubing ends.

7. The apparatus of claim 5 further characterized by means for varying the travel of said means for moving said gripping means to vary the space between the downstream end of the tubing and the upstream end of the separated tube segment to accommodate tube segments of various lengths.

* * * * *